(12) United States Patent
Choi et al.

(10) Patent No.: US 7,457,957 B2
(45) Date of Patent: Nov. 25, 2008

(54) APPARATUS AND METHOD FOR ISSUING AND AUTHENTICATING SECURITIES, ETC. USING DIGITAL WATERMARKING

(75) Inventors: Jong Uk Choi, Seoul (KR); Jong Won Kim, Taejeon (KR)

(73) Assignee: Markany, Inc., Seoul (KR)

( * ) Notice: Subject to any disclaimer, the term of this patent is extended or adjusted under 35 U.S.C. 154(b) by 633 days.

(21) Appl. No.: 10/221,401

(22) PCT Filed: Jan. 12, 2002

(86) PCT No.: PCT/KR02/00051

§ 371 (c)(1),
(2), (4) Date: Jan. 29, 2003

(87) PCT Pub. No.: WO02/056264

PCT Pub. Date: Jul. 18, 2002

(65) Prior Publication Data

US 2003/0159046 A1    Aug. 21, 2003

(30) Foreign Application Priority Data

Jan. 12, 2001    (KR) ................................ 2001-1940

(51) Int. Cl.
*H04L 9/00*    (2006.01)
*H04N 7/167*    (2006.01)

(52) U.S. Cl. ........................................ 713/176; 380/203
(58) Field of Classification Search ......... 713/176–177; 380/203
See application file for complete search history.

(56) References Cited

U.S. PATENT DOCUMENTS

| | | | |
|---|---|---|---|
| 5,930,369 A | 7/1999 | Cox et al. | |
| 6,230,268 B1 * | 5/2001 | Miwa et al. ................... 713/176 |
| 6,311,214 B1 * | 10/2001 | Rhoads ........................ 709/217 |
| 6,396,594 B1 * | 5/2002 | French et al. ............... 358/1.18 |
| 6,405,203 B1 * | 6/2002 | Collart ......................... 707/10 |
| 6,513,118 B1 * | 1/2003 | Iwamura ..................... 713/176 |
| 6,628,417 B1 * | 9/2003 | Naito et al. ................. 358/1.15 |
| 6,683,966 B1 * | 1/2004 | Tian et al. ................... 382/100 |
| 6,788,800 B1 * | 9/2004 | Carr et al. ................... 382/100 |
| 6,804,779 B1 * | 10/2004 | Carroni et al. .............. 713/176 |
| 6,823,075 B2 * | 11/2004 | Perry ......................... 382/100 |
| 6,834,344 B1 * | 12/2004 | Aggarwal et al. ........... 713/176 |
| 6,948,066 B2 * | 9/2005 | Hind et al. .................. 713/168 |

(Continued)

FOREIGN PATENT DOCUMENTS

JP    2000-299778    10/2000

(Continued)

*Primary Examiner*—Nasser Moazzami
*Assistant Examiner*—Mohammad W Reza
(74) *Attorney, Agent, or Firm*—Senniger Powers LLP

(57) ABSTRACT

Simultaneously with a robust watermark and fragile watermark or semi-watermark is embedded into conventional securities, etc., such as gift coupon, various kinds of ticket, coupon, electronic stamp, bond & debenture, note, stock certificate, lottery, paper money, check, etc. and various kinds of public documents including certificates, etc. requiring confirmation and authentication (hereinafter, referred to as "securities, etc.") in the form of digital file. Such watermark-embedded securities, etc. are conveniently issued on-line and are printed out in the form of paper through a printer. The printed securities, etc. are used off-line and are authenticated by determining the forgery or alternation by means of photocopy, etc. through the detection of the embedded watermark.

18 Claims, 13 Drawing Sheets

U.S. PATENT DOCUMENTS

| | | | |
|---|---|---|---|
| 6,993,154 B2 * | 1/2006 | Brunk | 382/100 |
| 7,003,731 B1 * | 2/2006 | Rhoads et al. | 715/768 |
| 7,007,166 B1 * | 2/2006 | Moskowitz et al. | 713/176 |
| 7,044,395 B1 * | 5/2006 | Davis et al. | 235/494 |
| 7,142,691 B2 * | 11/2006 | Levy | 382/100 |
| 7,181,042 B2 * | 2/2007 | Tian | 382/100 |
| 2001/0037313 A1 * | 11/2001 | Lofgren et al. | 705/67 |
| 2002/0018228 A1 * | 2/2002 | Torigoe | 358/1.14 |

FOREIGN PATENT DOCUMENTS

| | | |
|---|---|---|
| KR | 1998-053128 | 9/1998 |
| WO | WO 99/52271 | 10/1999 |

* cited by examiner

DWT EMBEDDING SECTION

APPARATUS AND METHOD FOR ISSUING AND AUTHENTICATING SECURITIES, ETC. USING DIGITAL WATERMARKING

TECHNICAL FIELDS

The present invention relates to apparatus and method for issuing and authenticating securities, etc. using digital watermarking.

More particularly, the present invention relates to apparatus and method for embedding watermark into the conventional securities such as gift coupon, various kinds of tickets, coupon, electronic stamp, bond & debenture, note, stock certificate, lottery, paper money, check, etc. which are in a digitalized file form, and various public documents being issued requiring confirmation and authentication (hereinafter, refer to as "securities, etc."), and for issuing such watermark-embedded securities, etc. on-line in a simple and safe manner. Moreover, in determining whether the above securities, etc. which have been printed out from the printer, etc. then issued are forged and altered through photocopying, etc., the present invention relates to apparatus and method for accurately and easily determining the authenticity of the securities, etc. through the detection of the embedded watermark.

The "securities, etc." used in the present invention is a term inclusive of all papers (tickets, gift certificate, electronic money, etc.) having commercial value or paper money value, i.e. having a legal right as well as certificate requiring authentication or certificate having various kinds of primary information.

BACKGROUND ART

Together with the recent rapid growth of computer science, various contents are digitalized according to the improvement on the efficiency of the high-technology apparatus including A/D or D/A conversion device such as printer, scanner, digital camera, etc. Also, as the process of generating securities, etc. is digitalized, the technique forging or altering such is being developed day by day.

In this regard, the forged securities, etc. refer to securities, etc. that are newly made one similarly or identically with self-genuine copy (original copy) by a person who has no right to issue. Such forged securities, etc. are directly printed by using scanner or printer, or photocopied by using a color photocopier.

Further, the altered securities, etc. mean securities, etc. with their appearance changed wherein the change is made to the contents of the genuine copy of the securities, etc. For example, such alteration includes changing the face value amount from the low amount to a higher amount, or increasing the value of security by changing the issue date or interest payment date or changing specific particulars such as the name of the certificate, etc.

In accordance with the growth of forgery or alteration technique, the forged/altered securities, etc. have become very precise rendering the determination by naked eye to be ever more difficult. Specially, when the forged/altered security is circulated, the entire finance market including the security market will become chaotic, and furthermore, a national economic dislocation may arise. In order to prevent such chaos, various preventive measures such as below are established and managed.

1. Method Using Special Paper

A method using special paper includes use of watermark paper, pre-printed pattern, OMR sheet or chemical watermark, etc.

Watermark paper is manufactured by gluing two sheets of paper into one. When processing pulp to make paper, a method for revealing an appearance of pattern at light exposure by inserting pattern of a desirable shape using wire into the laminated paper (paper made by gluing two sheets of paper) is used widely for a primitive prevention of forgery.

There is also a method using security thread invisible except for wire or visible hidden line. The security thread includes several types such as insertion of consecutive characters, luminescence at the exposure of ultraviolet light, and appearance of particular figure or characters at the rise of temperature when rubbed by hands, etc.

The pre-printed pattern is technically difficult and rare, which leaves very little room for time or space for its use. Thus, when making securities usually small in numbers such as gift certificate, OMR paper is widely used which has better strength than other paper and triggers rejection reaction against the color photocopier.

The chemical watermark employs chemicals which actually have similar features as the watermark paper. The chemical watermark treated with chemicals is far more cheap and convenient to use than the watermark paper, and an effect similar to watermark paper can be obtained in its functional aspect. Thus, the chemical watermark is valuably used.

2. Design Method

The design method includes a hologram application method, a method using special pattern such as duplication prevention figure or concentric fine line, a method using micro-printing and a method of matching front/back copy, etc.

The hologram application method is a method designing and transcribing a desirable shape into the film, and heating the transcribed film for stamping on the paper. It is possible to stamp any desirable figure in the films such as various color of gold film, silver film, blue film, green film, black film, rainbow-color film and hologram film, etc. in similar cases. During the photocopying process, the light cannot penetrate the film, so the stamped portion is photocopied in black. Thus, a form different from the original is obtained so that forgery including duplication is prevented.

A method using special pattern such as duplication prevention figure or concentric fine line is very useful in preventing a forgery case which uses scanner or photocopy machine. When scanning or photocopying, the light is flashed uniformly from one end to the other end and the dark portion of the refractive wavelength wherein patterns are formed is folded. Such folded form is photocopied as it has shaped, and a distinctive difference rendered according to the space and color between the shapes is employed. The method using special pattern such as duplication prevention figure, etc. is recently emerged and a unique forgery prevention method.

A micro-printing(also referred to as 'micro-lettering') is a method involving the size of characters or figures to be at least certain level when the halftone dots are selected by color or white and black photocopier. Such method will result in a spoiled original form of characters or shapes when the characters or shapes are printed out at the lower level by a color photocopier.

A method of matching front/back copy concerns a preventive method against duplicate print of the front/back sides by a forger forging the design. When photocopying twice for forgery, matching accurately the print out of the front side with the print out of the back side is a very difficult task for an ordinary technique. By applying the method of matching front/back sides, it is possible to prevent forgery of forging twice with the front and back sides.

The above-mentioned design methods play a big role in preventing the forgery/alteration of the securities. Forgery/alteration by an ordinary user without special device is fundamentally impossible.

3. Method Using Special Ink

A method using special ink includes a conventionally used fluorescence method, a method using ink for convexo-concave print, a method using metal ink (gold powder, silver powder, etc.), and a method using thermographical discoloration ink, unchangeable ink and chemical reactive ink, etc.

The fluorescent method involves a fluorescent phenomenon occurring from a mixture of fluorescent material and ink at the exposure of ultraviolet light, which is not visible by naked eye, but distinguishable only by ultraviolet light. This method is the most universally used forgery prevention technique at present times. Since it is not distinguishable by print-outs, its forgery prevention effect is very excellent. Its original use is intended for examining whether there is crack after welding the joints of the highly precision machine such as ships or spaceships, etc., but now it is applied in printing. The effect thereof is very good when simultaneously using both as it is visible by naked eye and it involves fluorescent ink.

4. Special Print Method

A special print method involves an integral printing, rainbow printing, negative printing, bar code printing, OCR, and MICR numbering printing, etc.

The integral printing is not a printing process of the general PS plate or of baking the film on a flat plate, but of corroding stainless copper plate, printing in ultraviolet ink, and drying by passing through ultraviolet light. When the surface is examined, a jagged convexo-concave phenomenon appears on the paper surface. Similarly imitating, a similar effect may be obtained by completing the printing before making the copper plate, and making convexo-concave by compressing with platon or press.

The rainbow printing is a process of printing each of several portions of parts made of a film or a plate in different colors, respectively. Such process involves removing a vibration roller installed for the purpose of blending the ink well among the machinery rollers, blocking the spot where the ink is distributed according to different colors, and letting the ink poured down as it is in a straight line.

The negative printing is accomplished by number of lines representing the thickness of between halftone dots when all the printing is accomplished. The general printing uses 175 lpi (lines per inch), the gift certificate uses at least 200 lpi and the photograph uses 1200 lpi. The current printing has been improved to the extent of using 1200 lpi. When printing with the angles between halftone dots well blended to make a pattern shape and to print, it is difficult to distinguish by naked eyes, but when photocopied, only the twisted/spoiled halftone dots are photocopied so that a pattern completely different from the original is photocopied.

The bar code printing is a process printing the previously prepared inputted bar codes. The forgery becomes impossible since the forger cannot confirm what content has been inputted.

In OCR, MICR numbering printing, the numbering itself has been established by encryption which is a special numbering having its own checking system. OCR detects with light, and recognizes magnesium blended in MICRDMS ink as magnetic material. The forger on the outside does not know the established codes so the forgery is impossible. OCR is widely used in preventing the forgery and alteration of the stock certificate, and MICR is a numbering method used for preventing the forgery/alteration of checks.

The aforementioned methods to prevent the forgery/alteration such as the method using special paper, the design method, the method using special ink, the method using special print, etc. are based on the safety of the forgery/alteration prevention methods relying on the specialty of ink or paper, etc. necessary for making all securities, and the weakness of the peripheral units such as a printer, a photocopier, etc. themselves.

Accordingly, the manufacturing cost is relatively expensive, the detection of forgery/alteration is different from each other in its detection devices or methods according to the difference in each respective method of use and manufacturing method. Particularly, an assistance from a certain institution when making securities is always necessary. It is very general that a certain institution monopolizes issuance of securities, otherwise a certain public trust attested by a certain institution is depended upon. Thus, in order to make securities applicable of forgery/alteration prevention techniques, involvement of several numbers of certain institutions is necessary.

Furthermore, a method for determining the forgery/alteration and an apparatus thereof are not universally accepted. Thus, for ordinary users to determine forgery/alteration, a considerable knowledge is required and the users should be in possession of a discerning ability corresponding thereto.

Also, recently the securities, etc. are all manufactured by digital file. However, the digital file made prior to the issuance in the paper form, in its features, has a problem which makes the authentication of the original copy impossible due to easy forgery/alteration, and unlimited duplication.

Accordingly, it is impossible to issue securities, etc. only by digital file itself.

SUMMARY OF THE INVENTION

In order to simultaneously solve the problems existing in each of the aforementioned complicated conventional forgery/alteration prevention methods using special paper, special design, special ink, special printing, etc. and the problem of impossibility in authenticating the original copy regarding the digital file, the present invention has an object to provide method and apparatus for issuing securities, etc. in digital file form as it is without any complicated process on user's behalf, and printing them out for their actual use.

In other words, the present invention sets its object on providing method and apparatus for issuing securities, etc. using digital watermarking wherein the watermark is embedded in the securities, etc. in a digital file form for authenticating the original copy, and such watermark-embedded securities, etc. are issued easily and safely on-line, or after the purchase and being printed out from the printer, the print outs in the paper form are immediately usable off-line as securities, etc.

Furthermore, the present invention tries to, as its object, provide method and apparatus for authenticating securities, etc. using digital watermarking wherein the determination of the forgery/alteration of the issued print outs in the paper form through off-line photocopying, etc. can be accurately and easily determined by the detection of the embedded watermark, and authenticated thereof.

That is, the present invention understands that the characteristics of digital file (digital document, image, etc.) bears a problem wherein the authentication of the original copy is impossible due to forgery/alteration and unlimited duplication. Thus, as the securities, etc. cannot be issued or purchased in the digital file form, the present invention aims as its object to provide apparatus and method for issuing and authenticating securities, etc. by using digital watermarking which can fundamentally prevent the illegal use of duplication copies. Such object allows the user to easily and safely get the securities, etc. issued or to purchase them on-line by applying the digital watermarking technique which makes the authentication of the original copy possible. After printing them out from the printer, the user is able to use them as securities, etc. in off-line state, and is able to determine accurately and easily the print outs (print-out copy) from the printer and the duplication copy (photocopied copy) from the photocopier when printing out the securities, etc. in the digital file form from the printer and using them off-line.

In order to achieve the above objects, the present invention provides a method for issuing securities etc. in printed-out form to a user, the method comprising the steps of (a) generating a digital file of said securities etc. and watermark according to an issuance-option which said user has selected; (b) embedding said generated watermark into said digital file of said securities etc.; and (c) printing out said watermark-embedded digital file.

It is also desirable that said method further comprise, before said step (a), a step of (a') connecting said user to a site which provides a service for issuing said securities etc. through a network and selecting an issuance-option.

It is also desirable that said watermark is generated in step (a) by using at least one of a key-type method, a logo-type method and a method simultaneously employing both methods.

It is also desirable that said generating watermark using a key-type method comprises, at least one of generating said watermark by a plurality of keys in accordance with primary information of said securities etc. or generating the watermark using a checksum or hash-value obtained from the entire information of said securities etc.

It is also desirable that said embedding said watermark at said step (b) comprises, at least one of embedding a robust watermark and a fragile watermark simultaneously, and embedding a semi-watermark into said digital file.

It is also desirable that said fragile watermark and said semi-watermark are embedded with a controlled embedding level such that said printed-out securities etc. are detected only when said securities have experienced the first A/D conversion through a scanner, and said printed-out securities not being detected when said securities have experienced later A/D or D/A conversion.

It is also desirable that said step (c) comprises the steps of: (c1) adding an option for controlling printing of said watermark-embedded digital file; and (c2) printing out said watermark-embedded digital file according to said option for controlling printing.

It is also desirable that said option for controlling printing at said step (c1) comprises an option for setting the number of print outs of said watermark-embedded digital file.

It is also desirable that said option for controlling printing further comprises, in the state of setting said number of print outs, an option for commanding a memory to delete the latest document simultaneously with an end of printing command after the printing command has been executed.

Furthermore, it is desirable that the above option for controlling printing at said step (c1) comprises, an option for displaying only an information of said securities etc. to be issued or only an image of securities etc. without watermark embedded thereto on a screen of the user's terminal when said watermark-embedded digital file is printed out.

In order to achieve the other object of the present invention, the present invention provides an apparatus for issuing securities etc. in printed-out form to a user, the apparatus comprising: an issuing means for issuing securities etc. in the form of digital file; a terminal being connected with said issuing means through a network, transmitting an issuance-option by selection of said user of securities etc. to said issuing means, and receiving securities etc. according to said issuance-option from said issuing means; and print-out means being connected with said terminal, printing out said securities etc. received from said terminal, wherein said issuing means comprises: means for generating a digital file of said securities, etc. and watermark according to said issuance-option, and means for embedding said generated watermark into said digital file of said securities etc.

In order to achieve another object of the present invention, the present invention provides a method for authenticating watermark-embedded securities etc. in the printed-out form, the method comprising the steps of: (d) reading said watermark-embedded securities etc. in the printed-out form and converting said securities etc. to a digitalized image; (e) extracting watermark embedded at an issuance apparatus from said digitalized image; (f) generating watermark from an information included in said digitalized image; and (g) determining authenticity of said securities etc. by calculating a correlation between said extracted watermark and said generated watermark.

It is desirable that the said step (g) comprises the steps of: (g1) calculating a correlation between the extracted robust watermark and the generated robust watermark; and (g2) calculating a correlation between extracted fragile watermark and generated fragile watermark, and the determination of the authenticity of said securities, etc. is made based on whether the correlation calculation between said robust watermarks and between said fragile watermarks satisfies a predetermined correlation condition.

It is also desirable that said step (g) comprises a step of: calculating a correlation between the extracted semi-watermark and the generated semi-watermark, and the determination of the authenticity of said securities, etc. is made based on whether the correlation calculation between said robust watermarks and between said fragile watermarks satisfies a predetermined correlation condition.

In order to achieve still another object of the present invention, the present invention provides an apparatus for authenticating watermark-embedded securities etc. in the printed-out form, the apparatus comprising: an image A/D converter for reading said watermark-embedded securities etc. in the printed-out form and converting said securities etc. to a digitalized image; and an authenticating unit for extracting a watermark embedded at an issuance apparatus from said digitalized image, generating a watermark from an information included in said digitalized image, and determining authenticity of said securities etc. by calculating a correlation between said extracted watermark and said generated watermark.

DESCRIPTION OF THE PREFERRED EMBODIMENTS

Hereinbelow, the preferable embodiments of the present invention is set forth in details in reference to the attached drawings.

Figure 1:
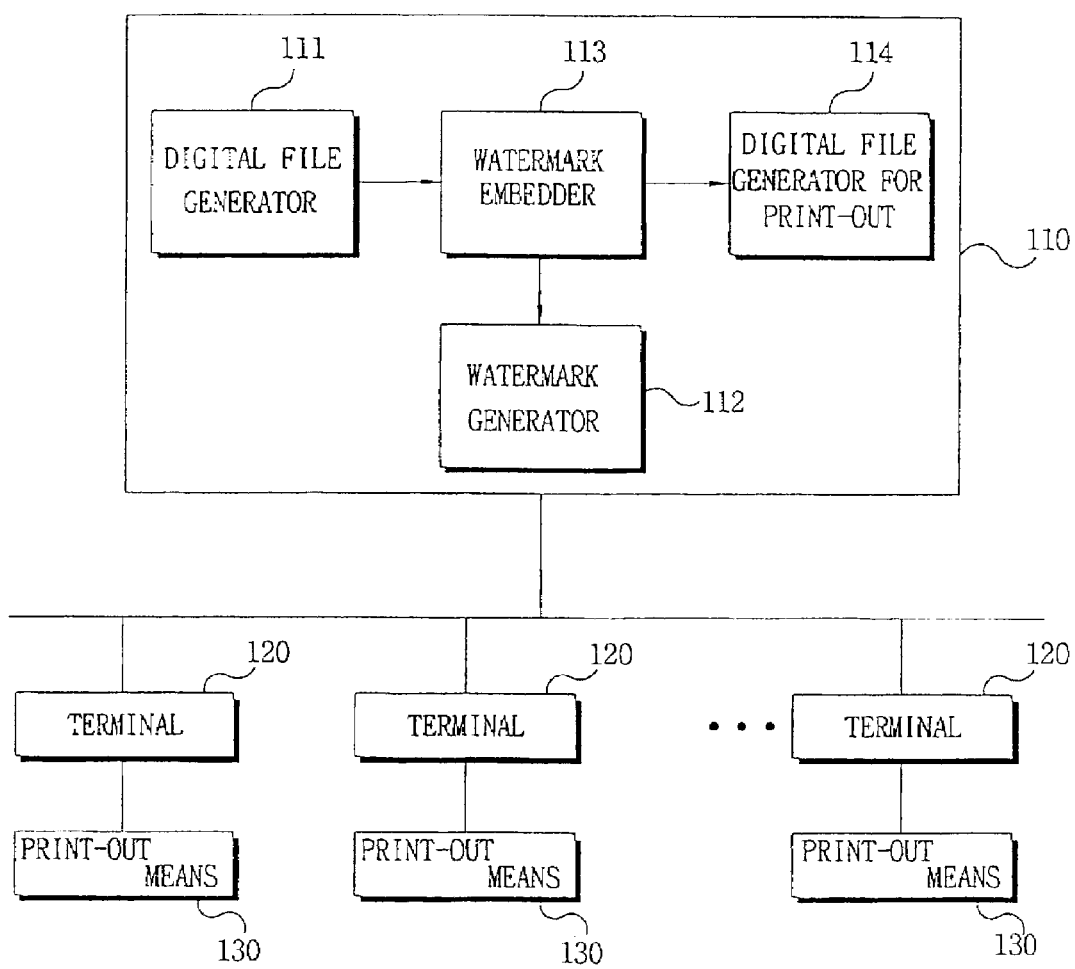
FIG. 1 is a block diagram illustrating the apparatus for issuing securities, etc. using digital watermarking according to the embodiment of the present invention.

FIG. 1 is a block diagram illustrating the apparatus for issuing securities, etc. using digital watermarking according to the embodiment of the present invention.

Referring to FIG.1, the issuing apparatus of the present invention comprises an issuing means 110 for issuing securities, etc., a plurality of terminals 120 being connected with the issuing means 110 through a network, and print-out means 130 being connected with each of the terminals 120 respectively, printing out the securities, etc. in the paper form.

The issuing means 110 comprises a digital file generator 111, a watermark generator 112, a watermark embedder 113, and a digital file generator for print-out 114.

The digital file generator 111 generates a digital file of the relevant securities, etc. according to the issuance-option selected by user from the terminal 120.

The watermark generator 112 generates watermark according to the issuance-option selected by user from the terminal 120, and such watermark is generated according to the above issuance-option by using at least one of a key-type method, a logo-type method, and a method simultaneously employing both methods.

The watermark by a key-type method may be identically defined as the key used in encryption in which a certain key is given and pseudo random numbers generated from the key is embedded as watermark. In this regard, the key may be a specific number or text only known to a person who generates it, and the key will be used at the later stage for extracting the watermark. In other words, under the assumption that the secretly embedded watermark is a code, the key is deemed to be a clue to decode such code.

The watermark by a logo-type method uses a series of images such as logo as watermark. The image data also can be represented in a series of digital signals. Thus, when embedding image data such as logo representing the issuer of the original data as watermark, a watermarking method which provides a more visual information than at extraction is available.

The watermark embedder 113 embeds watermark generated from the watermark generator 112 in the digital file generated from the digital file generator 111, wherein the robust watermark and the fragile watermark are simultaneously embedded in the above digital file or semi-watermark is embedded.

Generally, watermarking methods include, according to the embedding level (level the watermark is embedded) of signals bearing a series of information, a method for embedding a robust watermark surviving without disappearing against any external attack or modification or a method for embedding a fragile watermark easily modified at a minor external attack.

The method for embedding a robust watermark against the external attack maintains the information bearing the embedded signals as it is as the robust watermark survives without disappearing against various kinds of feasible external attacks. Such information includes the relevant information inclusive of the source regarding the securities, etc., and by confirming such information from the extraction of the watermark, a role authenticating the securities, etc. and distinguishing thereof from the forged/altered copies is to be assumed.

The method for embedding a fragile watermark against the external attack can accurately determine whether the make-up of forgery/alteration has been externally made by letting the watermark be damaged against a minor external make-ups. Accordingly, such method plays a role that makes the illegal use of the forged/altered securities, etc. impossible.

Other than employing the above mentioned method for embedding a robust watermark surviving against the external attack and a fragile watermark susceptible to attack, there is a method of semi-watermarking. The semi-watermarking method embeds a single watermark, however its attribute is not determined. It can be used as a robust watermark or a fragile watermark depending on an environment it is used such as external attack, conversion, etc.

The strength of the watermark has a close relationship with the kind of the external attack. The present invention classifies, depending on the strength regarding A/D conversion or D/A conversion such as mainly the printer's print outs, a hard copy (photocopying by a photocopier), etc., a robust watermark, a fragile watermark, and a semi-watermark in which a single watermark can be used as a robust watermark and a fragile watermark according to its application (hereinafter, the classification according to the strength is classification according to the A/D conversion or D/A conversion).

The watermarking method applied to the present invention is divided into a key-type method watermark and a logo-type method watermark depending on the methods of generating watermark. It is possible to embed a robust watermark, a fragile watermark or a semi-watermark with a key-type method watermark. The logo-type method watermark can also embed a robust watermark, a fragile watermark or a semi-watermark.

The watermark embedder 113 controls the embedding level so that only in a case only where the watermark-embedded securities, etc. that have been printed in the paper form, and then have undergone the first A/D conversion by scanner, etc. are detected when embedding the fragile watermark or the above semi-watermark in the digital file, but in a case where the subsequent A/D or D/A conversion has been made, the watermark-embedded securities, etc. are not detected.

It may be possible to forge/alter by making a duplication copy with the print-outs of printer using peripheral units such as a photocopier or a scanner, etc. In such case, all securities, etc. printed out in the paper form were made into digital image by using a scanner, etc. again in accordance with the authenticating method set forth in the description made below, and undergoes a series of process confirming the watermark embedded from the above digital image In this connection, as for a duplication copy by the photocopier, the robust watermark survives and is extracted. However, the fragile watermark or the semi-watermark is damaged by the external data loss due to photocopying, etc. The watermark of the copy scanned by a scanner is also damaged likewise so that the circulation of the illegal securities, etc. is originally uprooted and blockaded.

Accordingly, of the present invention, only the securities, etc. in the form of paper printed out from the original copy of the digital file satisfy the result of the extraction of the fragile watermark or the semi-watermark. In other words, the primary characteristic of the present invention lies in the controlling of the embedding level of the watermark so that only when the image of the securities, etc. in the form of paper is converted to the digital form for the first time (for example, scanning for authentication), the fragile watermark or the semi-watermark is to be detected, and after undergoing the subsequent A/D conversion or D/A conversion through scanner, photocopier, printer, etc., the fragile watermark or the semi-watermark is not to be detected.

The digital file generator for print-out 114 provides an option for controlling the print out means 130 in order to prevent the printing the identical issued copy out and using it freely according to its issuance option when the watermark-embedded digital file out of the watermark embedder 113 is issued on-line and printed out in the paper form.

In other words, when the watermark-embedded digital file is printed out in the paper form from the above print-out means 130, an option for setting arbitrarily the number of print-outs can be added. Or, after executing the print-out command in a state wherein the number of print-outs is set, an option for commanding to delete the latest document in the memory of the terminal simultaneously with the end of the print-out command.

Or, when the water-mark embedded digital file is printed out in the paper form from the print-out means 130, an option for establishing either a display of the information only which confirms the content of the securities, etc. to be issued on the screen of the above terminal or a display of the images only of the securities, etc. which do not embed watermark thereto can be added.

The terminal 120 is connected with issuing means 110 through the network, and furthermore, the issuance-option of the securities, etc. which are sought to be issued through the terminal 120 is selected and transferred to the above issuing means 110. Also, the terminal 120 receives the securities, etc. according to the above issuance option and gets them printed out in the paper form through the print-out means 130.

The terminal 120, for example, may be Personal Computer (PC), Personal Digital Assistants (PDA), etc. which are connected to a network such as internet and exchanges the data with the issuing means on-line. The terminal 120 is connected with the print-out means 130 by wire or wireless transmission, and get the securities, etc. issued, for example, through a printer.

Figure 2:
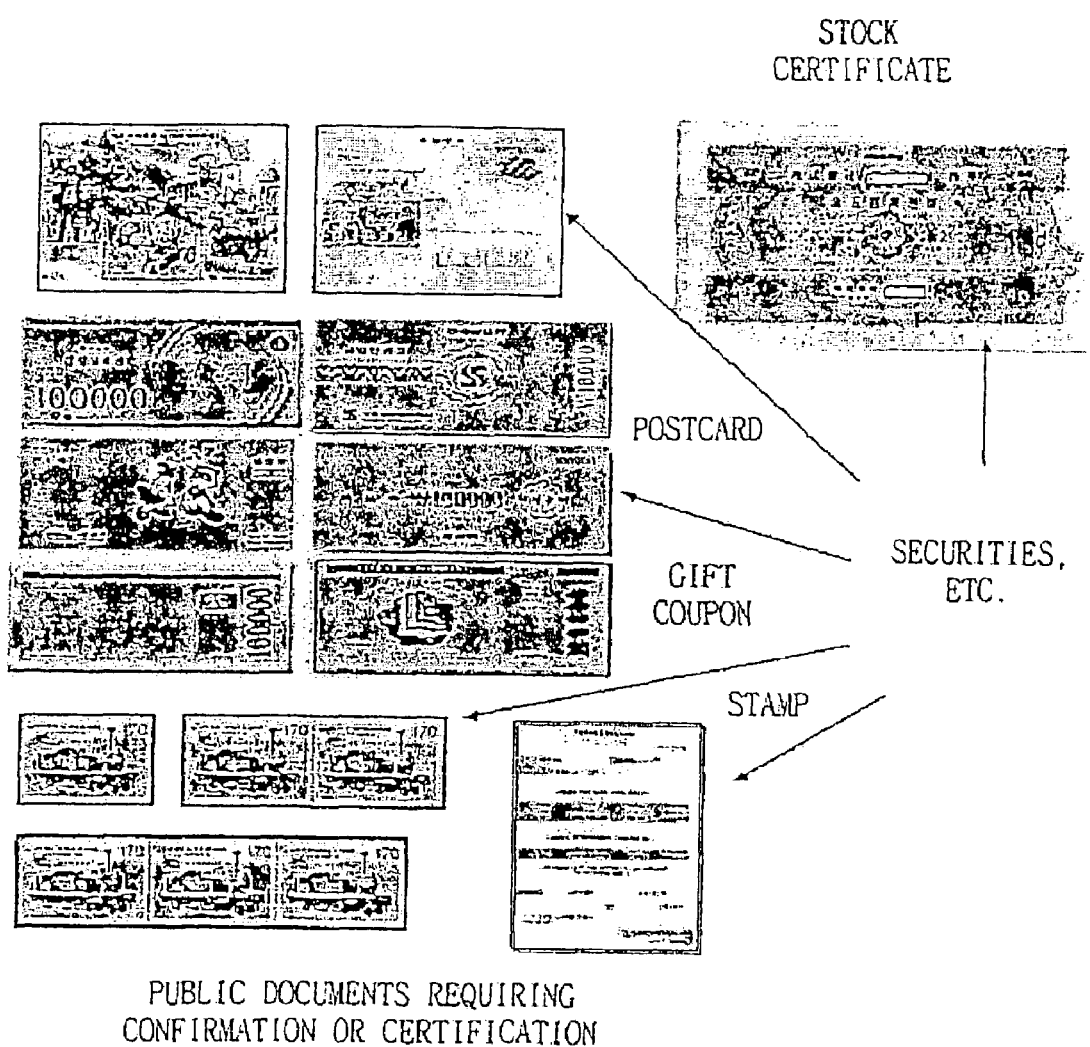
FIG. 2 is a drawing exemplary showing the kinds and shapes of the securities, etc. issued from the issuing apparatus of FIG. 1.

FIG. 2 is a drawing exemplary showing the kinds and shapes of the securities, etc. issued from the issuing apparatus of FIG. 1. The securities, etc. applicable to the present invention include the conventional types of securities such as gift certificate, various kinds of tickets, coupon, electronic stamp, bond & debenture, note, stock certificate, lottery, paper money, check, etc. in a digitalized file form, and various public documents being issued requiring confirmation and authentication.

The present invention can utilize the design used in the conventional securities, etc. again, and by embedding watermark thereto, the issuance and circulation of the above conventional securities, etc. can be actively bloomed by a more convenient method.

Figure 3:
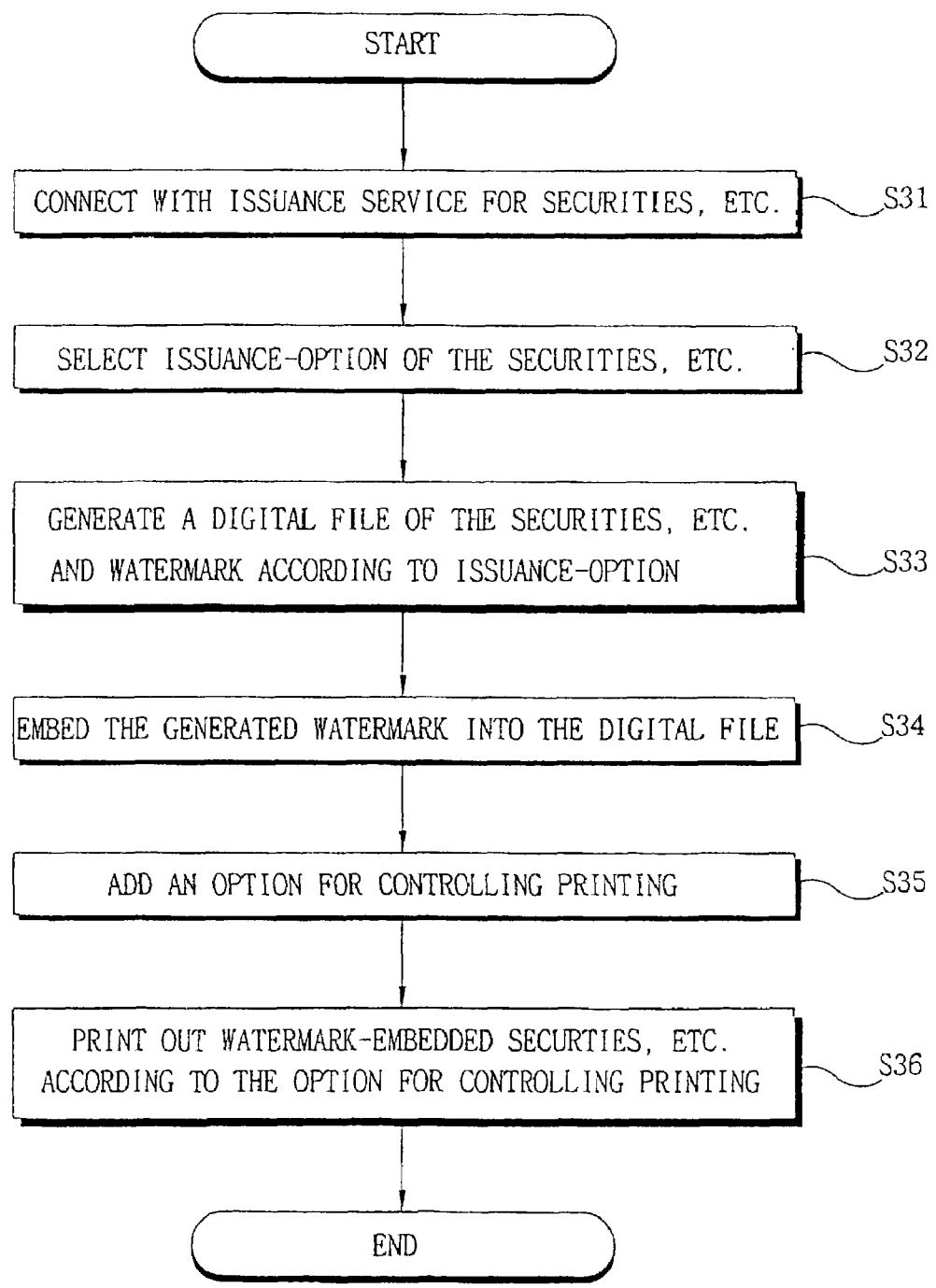
FIG. 3 is a flowchart illustrating the process of issuing securities, etc. from the issuing apparatus of FIG. 1.

FIG. 3 is a flowchart illustrating the process of issuing securities, etc. from the issuing apparatus of FIG. 1. Referring to FIG. 3, the process of issuing the securities, etc. in accordance with the embodiment of the present invention is explained hereinbelow.

First, the user connects with issuance service for the relevant securities, etc. which he/she wishes to get issued through network (S31), and selects an issuance option of the relevant securities, etc. (S32).

The above securities, etc. issuance service may be devices such as issuers of the securities, etc., homepage, web server or kiosk of the securities, etc. issuers. Also, the servers connected with user are respectively different according to the difference in each of the securities, etc. desired by user.

The user connects with the issuer from which he/she wants to get the desired securities, etc. issued and selects the option necessary for the securities, etc. to be issued. At this moment, the user selects the necessary information. For example, in a case of electronic stamps, there are an option for selecting express mail or registered mail or ordinary mail for the postal matters to be sent, an option for selecting price according to the weight of the post matters, and an option for selecting the design of the electronic stamp, etc. In a case of gift certificates, there are an option for selecting kinds of gift certificates such as fitness gift certificate, oil and gas certificate, book gift certificate, merchandise gift certificate, merchant specific gift certificate, etc., an option for selecting price of the gift certificates, and an option for selecting the term of validity, etc.

In a case of securities, an option regarding the face value, an option for term of validity, and an option regarding information on the issuer's agencies concerned, etc. are being selected. According to the above user's selection, the kinds and features of the securities are determined.

According to the issuance option selected in the above, the digital file and watermark of the relevant securities, etc. are generated (S33)

When the kinds and features of the above securities, etc. are determined, the digital file of the pertinent securities, etc.

based thereon is generated, and also, the watermark to be embedded into such digital file is generated.

Figure 4:
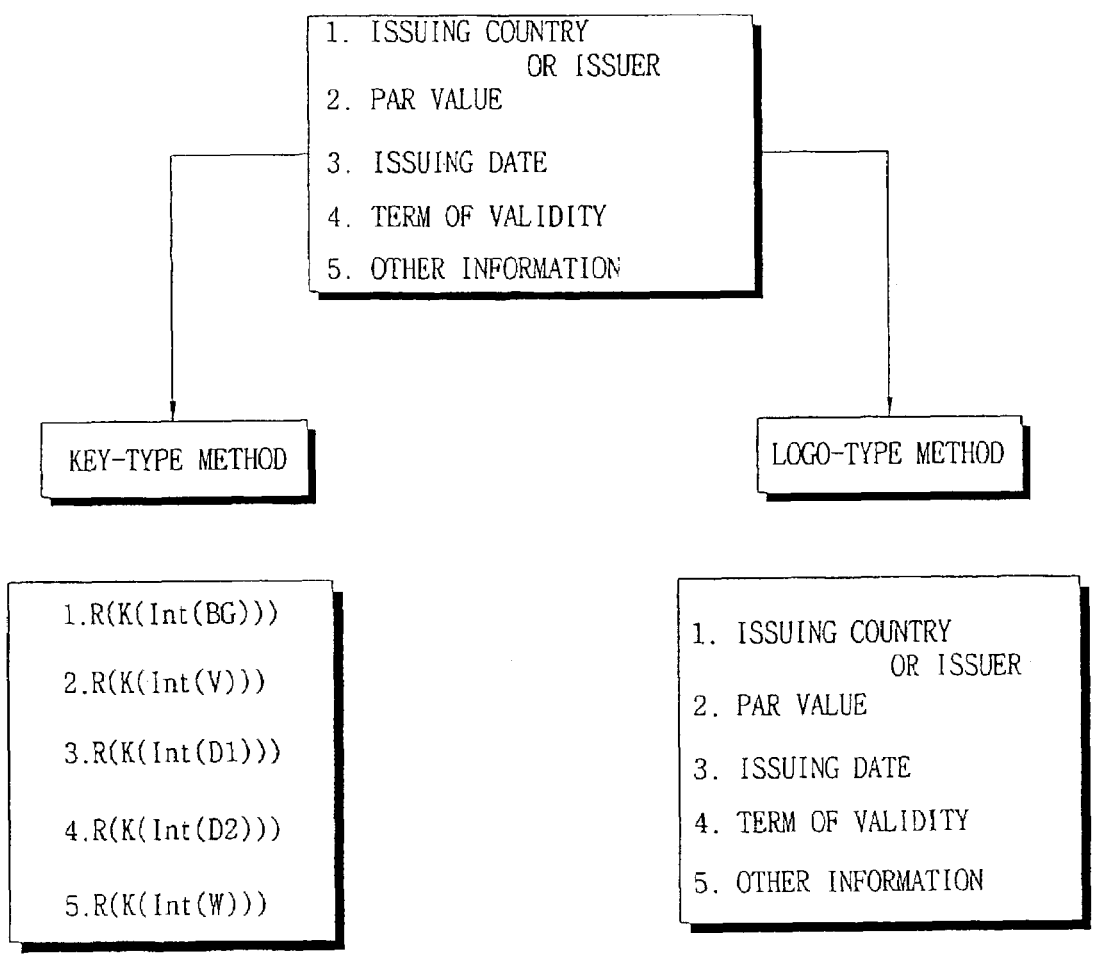
FIG. 4 is a drawing representing each of the cases classified accordingly wherein the information determined by kinds and features of the securities, etc. issued from the issuing apparatus of FIG. 1 is generated as watermark by a key-type method and by a logo-type method, and is embedded in the digital file.

FIG. 4 is a drawing representing each of the cases classified accordingly wherein the information determined by kinds and features of the securities, etc. issued from the issuing apparatus of FIG. 1 is generated as watermark by a key-type method and by a logo-type method, and is embedded in the digital file.

The information embedded as watermark becomes a very important information necessary for protection or confirmation regarding the securities, etc. selected by user. That is, such information is made of price information, issuance-related information, term of validity information, and information on user who got issued, etc.

The information of the watermark to be embedded which is determined by kinds and features of the securities, etc. includes the following information.

First, information of the issuing country or issuer is included. Securities, etc. such as electronic stamps or government issuing bonds require information on issuing countries. For stock certificates or gift certificates, issuer information is included. As for gift certificates issued from the department stores, information specifying the pertinent department stores is included.

Secondly, the par value is included. Electronic stamps, gift certificates, stock certificates, bond & debentures, notes, etc. include par values as values of all securities. For example, in case of electronic stamps, price is divided into 170 Won, 250 Won, etc. and in case of gift certificates, they are divided into a fifty-thousand Won gift certificate, a hundred-thousand Won gift certificate, etc. (Won is refers to a monetary Unit in the Korea) In case of stock certificates, each stock certificate will be different from each other according to the issuers wherein the stock certificates are divided into a five-thousand Won stock certificate, etc.

Third, the issuance year of the securities, etc. is included. Almost all securities, etc. include the issuance year.. The relation between issuance year and face value of securities such as bond & debentures or notes are more important.

Fourth, the term of validity of the securities, etc. is included. The term of validity of the notes or bond & debentures is closely related to their values. Particularly, for notes, authentication regarding the term of validity is an indispensable factor.

Fifth, securities, etc. will additionally include extra information according to their own needs other than the above described four information. Securities, etc. such as entrance tickets or user tickets include information such as subjects, place, designated number, etc. necessary for the relevant securities.

Sixth, check-sum value or hash value, etc. regarding information on securities in order to determine the forgery of all information in the securities, etc. can be included as a key information for generating watermark signals. For instance, new value, i.e. check-sum value or hash value using the above user information are generated. In other words, the check-sum value or hash value generate a certain length of data based on the existing information, which do not conform to the check-sum value or hash value when portion of the existing information has been changed.

Information embedded as watermark in the securities, etc. is generated based on the basic information included in such securities. According to the technical factors of the embedding watermark, watermark using a key-type method watermark, a logo-type method watermark, or watermark using both key-type method and logo-type method are generated based on the above watermark information to be embedded, and embedded into the securities, etc. of the existing digital file type.

Embedding watermark is classified into a case of simultaneously embedding robust watermark and fragile watermark, and a case of embedding a semi-watermark. When simultaneously embedding robust watermark and fragile watermark, the robust watermark by a logo-type method or a key-type method generated from the above information of the securities, etc. and a fragile watermark by a logo-type method or a key-type method are embedded concurrently in the digital file, and based on the embedded watermark information, legality of the securities, etc. are determined later.

A circumstance wherein information to be embedded in said securities, etc. is embedded with watermark generated by a key-type method and a circumstance wherein the watermark is generated by a logo-type method are explained as follows.

First, a key-type method illustrated on the left side of FIG. 4 is explained.

In a key-type method, a key is generated based on the information to be embedded. That is, a key for generating a signal to be embedded into securities, etc. in the form of digital file is generated based on the information that is included in securities, etc.

The process of generating a key is explained by taking an example, e.g., in case where the embedded information is an issuing country—KOREA (BG refers to information on an issuing country, BH refers to information on an issuing company or an issuer) as follows:

(1) Int(BG) step: A code sequence is generated based on the watermark information, i.e., an issuing country—KOREA, to be embedded by the information of securities. That is, change of a character-formed variable into the ASCII code value results in a sequence of number. For example, a character is changed into k 75, etc. according to the ASCII code table.

(2) K(Int(BG)) step: The generated number sequence becomes a key of generating a signal to be embedded as a watermark (the generated number sequence of ASCII code=random number generating key=seed value).

(3) R(K(Int(BG))) step: A random number sequence is generated by the key generated in said step (2). There are various methods in generating a random number by a decimal sequence in which a seed number method is most frequently used. That is, a random number is generated by making the key generated in said step (2) as one seed number. After all, R(K(Int(BG))) itself, a sequence comprising the generated random number, becomes a watermark to be embedded as a signal including information.

R(K(Int(V))) in the left side of FIG. 4 is a random number sequence generated by the par value of securities, R(K(Int (D1))) is random number sequence generated by the issuing year of securities, and R(K(Int(D2))) is a random number sequence by the term of validity. Finally, R(K(Int(W))) is a random number sequence generated by other information of securities. The generated random number sequence as above is embedded as a watermark. Upon detecting watermark, a key is generated based on the information of securities, etc. and a random number sequence is generated by the generated key in the same manner as described above. Further, authenticity of securities, etc. is determined by means of a method of calculating correlation between the random number sequence generated by the information of securities, etc. and the sequence extracted from watermark which is embedded into securities, etc.

Next, a logo-type method illustrated in the right side of FIG. 4 is explained.

A logo-type method means that information which is included in securities, etc. is generated as a watermark as it is and then embedded; that is, it is embedded by imaging the information to be embedded. For example, the information that is included in securities, etc., i.e., issuing country—KOREA, price—50000 Won, term of validity—2000. 12. 31, is imaged as they are and then embedded.

Figure 5:
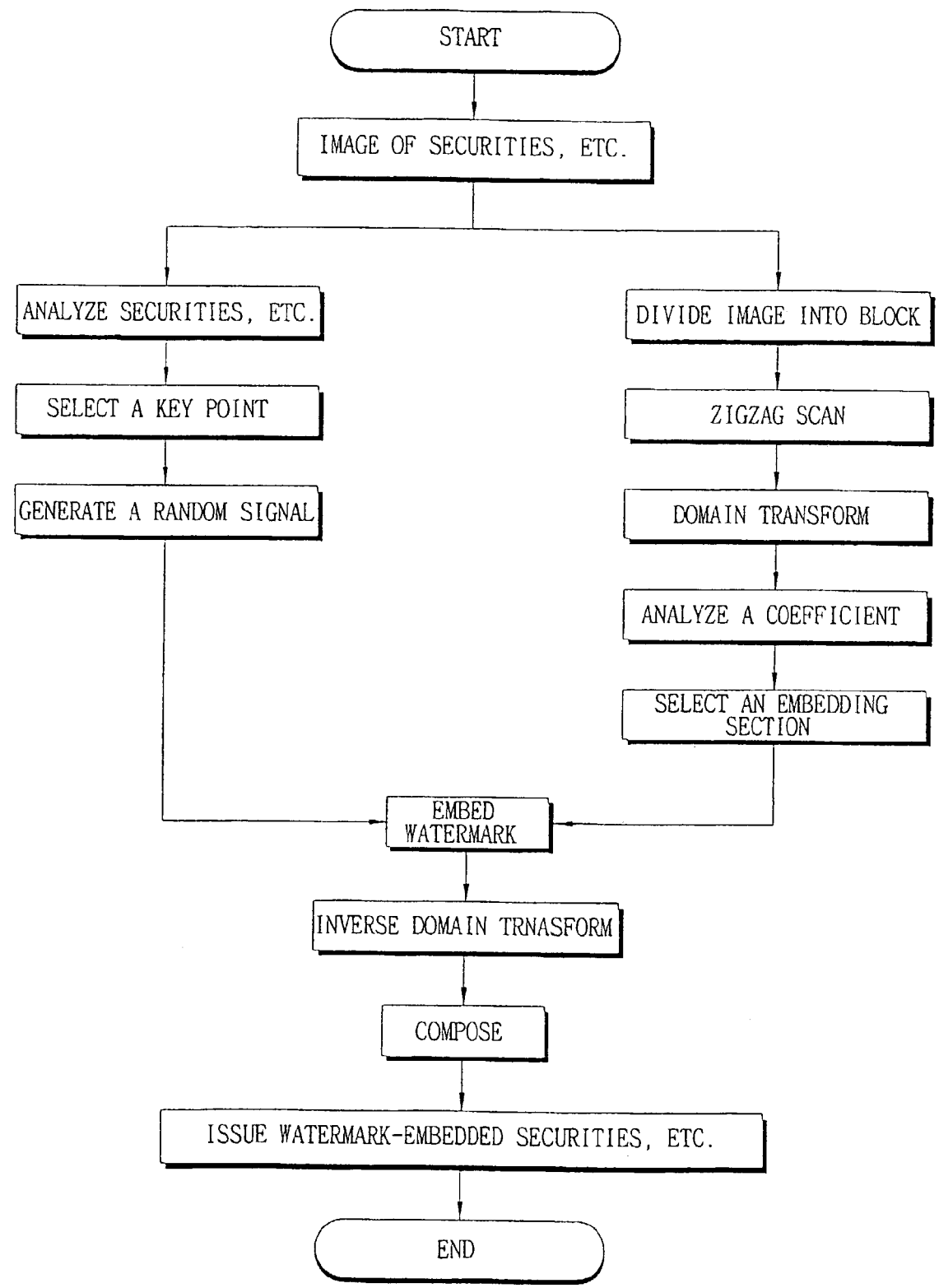
FIG. 5 is a flow chart representing a process of embedding information determined by kinds and features of the securities, etc. issued from the issuing apparatus of FIG. 1 as a watermark by a key-type method.

FIG. 5 is a flow chart representing a process of embedding information determined by kinds and features of the securities, etc. issued from the issuing apparatus of FIG. 1 as a watermark by a key-type method.

A key-type method is based on detection of which core lies in detection. A step of generating a key is first explained and then a step of embedding a watermark into securities, etc. is explained.

A step of generating a key comprises the steps of analyzing securities, etc., selecting a key point, generating a random signal. Through said three steps, a key being used is selected and a signal is generated by the key. Selection of a key being used is executed in the step of selecting a key point.

Said step of generating a key employs a part of information of securities, etc. as various keys or a checksum value or a hash value relating to the entire information of securities, etc, as a key.

Specifically, in case where both text-formed information and image-formed information coexist in securities, etc. themselves, there are various methods including a method of selecting a key by applying a certain rules to the existing text, a method of selecting a key based on the information to be input so as to issue securities, etc. by connecting a user to a main server, and a method of selecting a key based on price, date, connecting time and the like of securities, etc. to be issued.

For example, in case where both text-formed information and image-formed information coexist in securities, etc. themselves, there are many methods, e.g. characters from $5^{th}$ to $9^{th}$ are employed as a key, five characters from the first appearing character 'A', in the document are employed as a key, if the price of securities, etc. is 10000 Won, the price itself is employed as a key.

Meanwhile, the information which is actually embedded is not a key but a signal (random number sequence as mentioned above) generated by the key. Using a key generated in said step of selecting a key point leads to generating such signal.

There are various methods in generating a signal to be embedded. For example, a method of employing a key itself as a signal, a method of embedding a signal generated by encrypting already known text document using a key as a secrete key of the designated document, a method of making a key as a seed number and generating a random signal and taking a part thereof, and a method of preparing and embedding a signal paired with the key using a specific function.

As such, a random signal related to the key is generated after going through three sub-steps of the step of generating a key. Herein if a key is defined as k and a signal generated by the key and then embedded is defined as S(k), the image of security (image which is included in securities, etc. or image of security itself) goes through the steps of image blocking, zigzag scan, domain transform, analysis of coefficient, and selection of the embedding section, which are the pre-processing steps for embedding the signal S(k).

First, in the step of image blocking, the existing image of securities, etc. are divided into a block. Images are usually divided into the form of 8×8, 16×16, 32×32. In this regard, since the form of image of securities, etc. differs depending on the issuer or type of securities, etc., said division is necessary for applying to a variety of forms in the image, which has a close relation with strength of a signal to be embedded.

Next, the step of zigzag scan is a process for converting two-dimensional image data into one-dimensional image. Raster scan or Hilbert scan and the like are employed other than said zigzag scan.

Next, in the step of domain transform, a domain of the data from said zigzag scan is transformed using a mathematical transform. There are DFT, DCT, DWT, etc. in a mathematical transform being used.

Next, the step of analyzing a coefficient determines a section of selection. In case of proceeding with transform such as DFT, DCT, and DWT, the processing of embedding a watermark is made in a frequency domain. The transformed data is divided into a low-frequency component and high-frequency component wherein high-frequency component largely disappears in applying algorithm like compression, whereas low-frequency component is not suitable for embedding a signal since even its minor change largely affects on the entire image. Thus, finding out a section for embedding a watermark and deciding to embed a signal in which form into the section in the low-frequency component are important in applying algorithm.

Next, the step of selecting the embedding section selects a section into which watermark is embedded. Selection of the embedding section has a close relation with the mathematical transform employed.

Figure 6A:
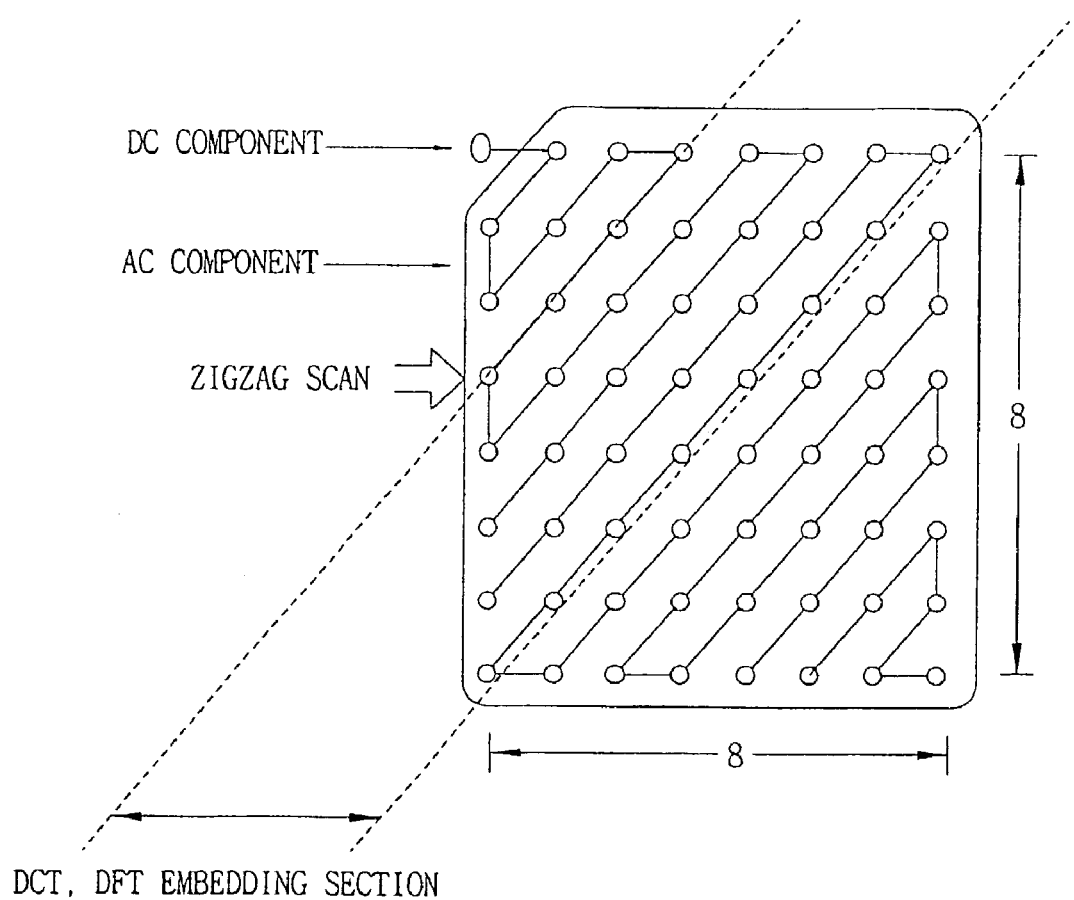
FIG. 6a is a drawing showing the selection of the embedding section when using DCT and DFT at the frequency domain during the process of embedding watermark by key-type method in FIG. 5.
Figure 6B:
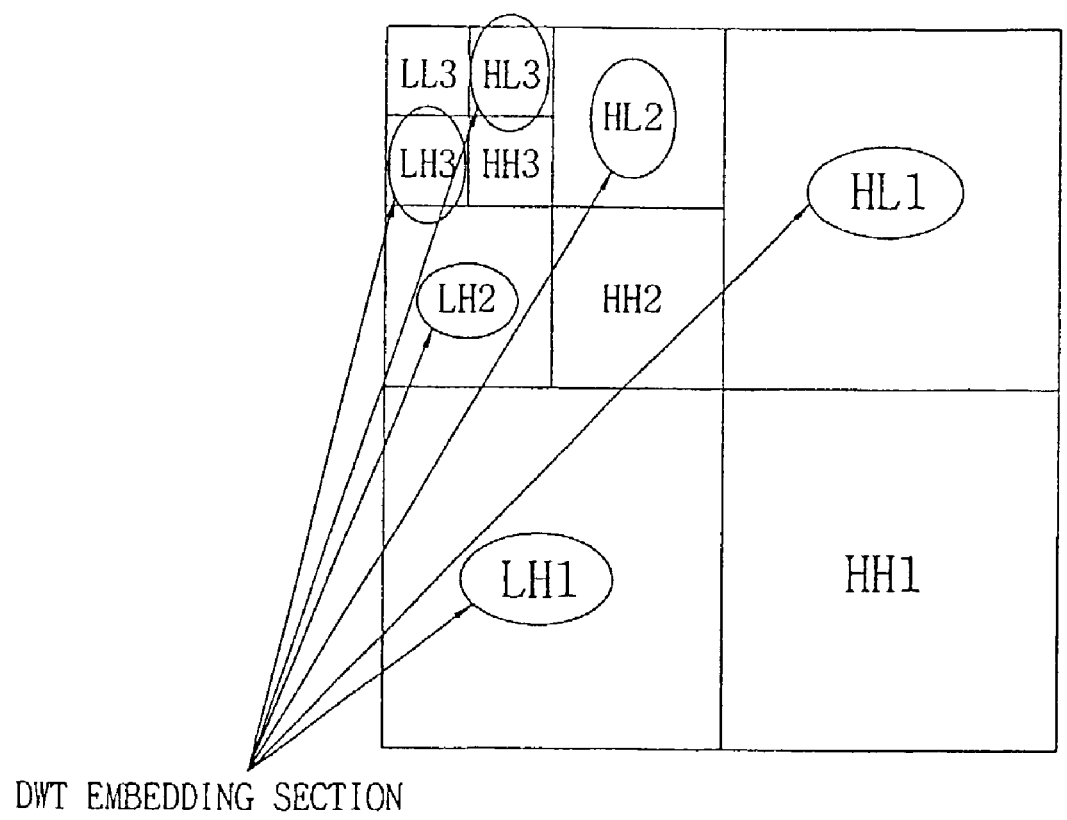
FIG. 6b is a drawing showing the selection of the embedding section when using DWT at the frequency domain during the process of embedding watermark by key-type method in FIG. 5.

Said domain transform includes a discrete cosine transform (DCT), discrete fourier transform (DFT), discrete wavelet transform (DWT), etc. Using these methods results in transforming a domain into a frequency domain. In selecting a section for embedding a watermark, a method of embedding a watermark into middle- or low-frequency area is shown in FIG. 6a and FIG. 6b.

In case of employing DCT or DFT, a section of embedding the signal S(k) is shown as FIG. 6a which is specifically explained later. In case of employing DWT, its embedding section is shown in the form of block as FIG. 6b which is specifically explained later.

As described above, after generating a watermark to be embedded, said generated watermark is embedded into said selected embedding section of the digital file of said corresponding securities, etc.

A fragile watermark is first embedded into said digital file and then a robust watermark is embedded. If a semi-watermarking is applied, a semi-watermark is embedded regardless of the order. Embedding said generated watermark into securities, etc. makes said watermark-embedded securities, etc. into securities, etc. with their issuance or purchase available.

It could be said that the process of embedding the generated watermark based on the information from kinds and features of said securities, etc. into a digital file indicates the process of embedding the signal S(k) generated by a signal key into the digital file of securities, etc. generated through said pre-processing steps. In case of embedding said S(k) into digital file as it is, since the image of securities, etc. is changed, a correlation coefficient a is employed in embedding the S(k). The embedding process is expressed as the following mathematical formula 1.

$$W'(u)=W(u)+\alpha \cdot S(k) \quad \text{[Mathematical Formula 1]}$$

Herein, W'(u) refers to data of the watermarked security data, W(u) refers to data of the original security, α refers to a parameter necessary for controlling strength of the signal data S(k) to be embedded and data of the original security. A process of embedding a watermark expressed as said mathematical formula 1 is more specifically explained.

The present invention suggests new methods to decide the property of watermark in embedding a watermark. In particular, the present invention suggests a watermarking method capable of off-line detecting (as a result of printing, a watermark is detected in a printing-out in the form of paper and the printing-out in the form of paper is authenticated) so as to detect a watermark in state of printed-out. Its specific content is explained referring to FIG. 6a and FIG. 6b.

FIG. 6a is a drawing showing the selection of the embedding section when using DCT and DFT at the frequency domain during the process of embedding watermark by key-type method in FIG. 5, and FIG. 6b is a drawing showing the selection of the embedding section when using DWT at the frequency domain during the process of embedding watermark by key-type method in FIG. 5

The selection of the embedding section using DCT and DFT are illustrated with reference to FIG. 6a, and that of using DWT is illustrated with reference to FIG. 6b.

A method of embedding a watermark with reference to FIG. 6a is explained hereinbelow.

If each converted DCT coefficient is Ci, it is K<Ci<R (K, R>0). Under such condition, there are two methods of embedding a watermark. The range of data applying said two methods is indicated as the embedding section of DCT and DFT in FIG. 6a. The first is a method by the replacement and the second is a method by the summation (+). Before executing such two methods, the identical coefficient, which is Ci=Pi, is set.

Firstly, in a method by the replacement, in case where it is −1<Ci<1, it is set as Wmi=Pi (Wmi refers to a watermark coefficient).

Secondly, in a method by the total, in case where it is Ci<−1, Ci>1, it is set as $Ci=Ci+\alpha|P_i|Wmi$ wherein $\alpha$ is a coefficient of controlling the embedding strength.

If a watermark is embedded by said embedding method, although a watermark is illegally generated due to the disclosure of key value or random sequence, such illegally generated watermark fails to be detected if the embedding method is not identical to as described.

In FIG. 6b, the part indicated by an arrow is the DWT embedding section. Like FIG. 6a, a method of embedding a watermark is able to apply both method by the replacement and method by the summation (+) whose explanation is the same as that of FIG. 6a.

Figure 7:
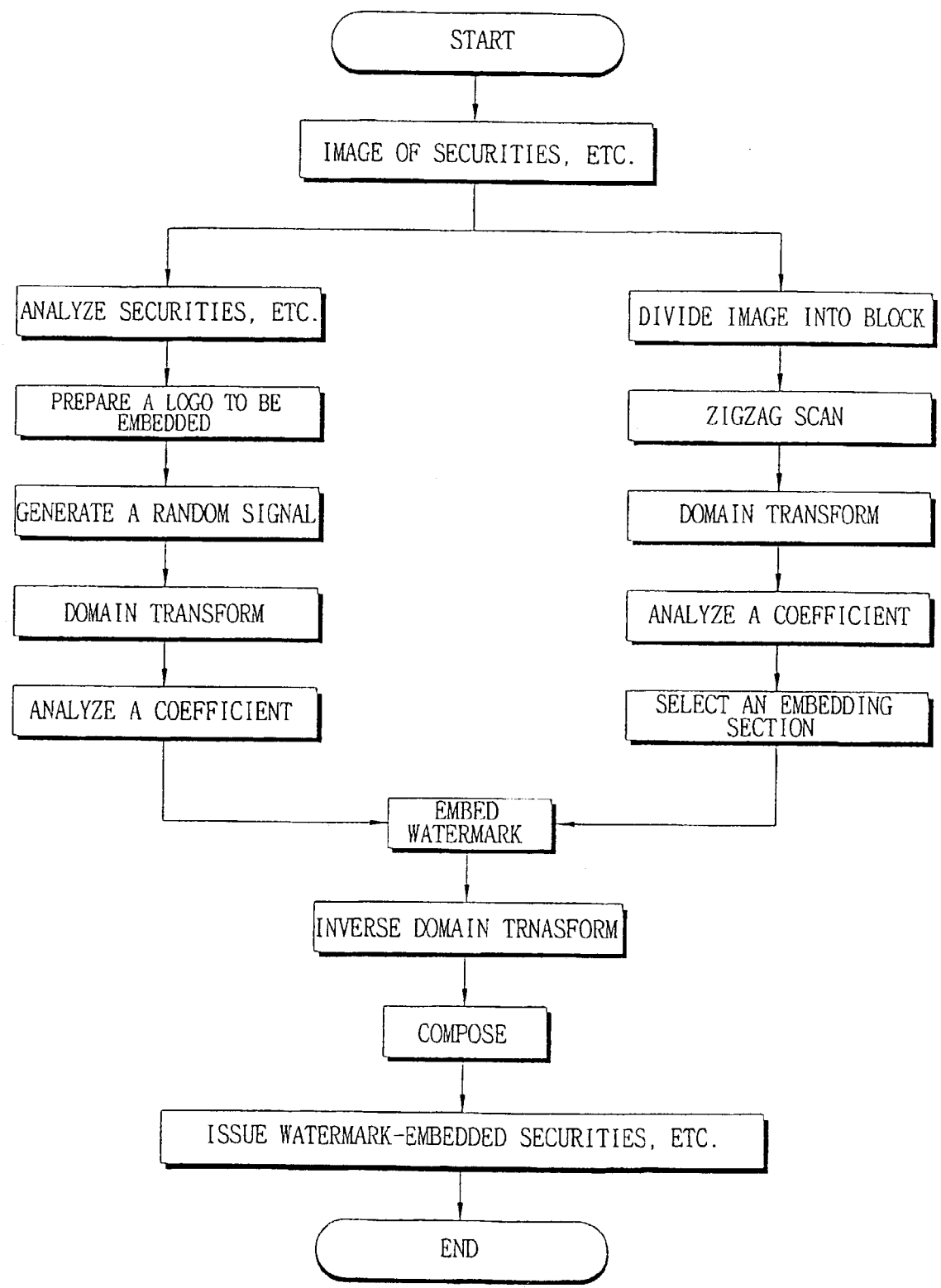
FIG. 7 is a flowchart representing a process of embedding information determined by kinds and features of the securities, etc. issued from the securities, etc. issuing apparatus of FIG. 1 as a watermark by a logo-type method.

FIG. 7 is a flowchart representing a process of embedding information determined by kinds and features of the securities, etc. issued from the securities, etc. issuing apparatus of FIG. 1 as a watermark by a logo-type method.

An embedding process of logo-type method is almost the same as those of key-type method, except that a signal to be embedded is different from that of a key-type method. That is, said two embedding methods explained with reference to said FIG. 6a are applied to a logo-type method.

The signal to be embedded in the logo-type method is prepared on the basis of an image form or text form. First in the step of preparing the embedding logo in FIG. 7, a logo to be embedded is prepared on the basis of securities, etc. At this time, a logo to be embedded is made to include information necessary for securities, etc. The logo conversion step executes a specific conversion in order to maintain the characteristics of a watermark such as robustness or fragility after embedding. For example, in case where a logo is a monochromatic image, a method of changing the range of quantization, etc. belongs to a logo conversion. Subsequently, a domain transform is executed. Other remaining process is the same as that of the key method explained with reference to FIG. 5.

Further, there is employed a method in combination with said logo-type method and said key-type method. Such method makes it possible to determine whether securities, etc. are forged or altered in comparison with information of securities, etc. extracted by a logo-type method and logo information initially embedded or, whether securities, etc. are forged or altered and photocopied in comparison with information of securities, etc. extracted by a key-type method and information initially embedded as a key.

In contrary, such method enables to determine whether securities, etc. are forged or altered in comparison with information of securities, etc. extracted by a key-type method and information initially embedded as a key or, whether securities, etc. are forged or altered and photocopied in comparison with information of securities, etc. extracted by a logo-type method and logo information initially embedded.

Referring back to FIG. 3, when watermark embedded securities, etc. in the form of digital file in the step of S34 are transmitted to a user through a network by adding an option for controlling printing (S35), the user prints out a watermark-embedded digital file according to the option for controlling printing (S36).

Figure 8:
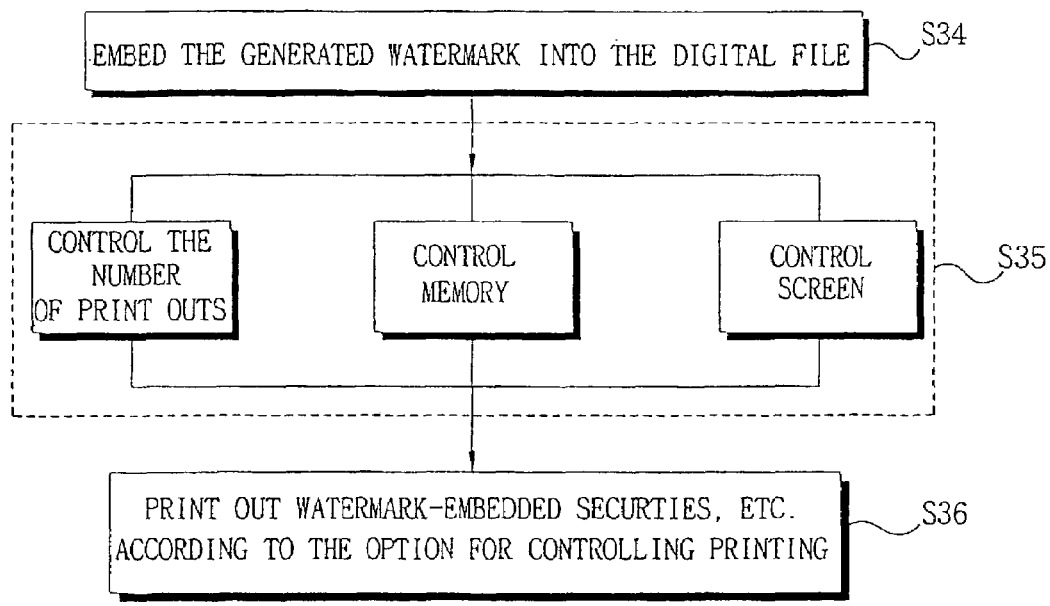
FIG. 8 is a drawing specifically representing a step (S35) adding an option for controlling the print outs from the printer in the flow chart of FIG. 3.

FIG. 8 is a block diagram specifically representing a step (S35) adding an option for controlling printing in FIG. 3.

Since said securities, etc. are available immediately after being printed-out by a user, the user should go through the step (S35) of controlling printing, which prevents watermark-embedded securities, etc. from being printed-out several sheets and being used in duplication.

To be more particular, if a user wants to printout securities, etc., said terminal 120 should satisfy the requirement of printing-option. The printing-option provided in the issuing means 110 provides an option for controlling setting of the number of print outs, option for controlling memory, and option for controlling screen and the like.

First, the option for controlling setting of the number of print outs controls the process of setting the number of print outs of securities, etc., which is identical in the existing setting of print out. The printing-option provided in the issuing means 110 controls so as to set only the number of print outs to meet the requirement of issuance.

In other words, the number of print outs is fixed as much as the number of sheet for which a person who requests an issuance paid, which is for the purpose of preventing the identical security from being used in duplication.

The option for controlling a memory is to decide the number of print outs as much as the number of sheet designated according to the conditions, which is to complete the process in the option for controlling setting of the number of print outs.

If a user is printing, the information related to the printing is temporarily stored in a memory. The user commands a memory to delete the latest document of memory simultaneously with an end of printing command after the printing command has been executed. Thus, the print out through second times is completely controlled.

The option for controlling a screen is to prevent a computer screen itself from being captured and printed out. For this, various methods are employed.

First, when issuing securities, etc. from the issuing means 110, it is set to print out securities, etc. immediately after a buyer confirms that the image of ticket itself to be issued is not displayed on a screen and only the information capable of confirming the content to be issued is displayed.

There is another method that the image of securities, etc. with no watermark embedded is displayed on a screen whereas, a watermark-embedded image is actually issued.

As described above, issuance of securities, etc. using a digital watermarking of the present invention analyzes the kinds and features of each of securities, etc., generates a digital-file and watermark to be embedded into said digital file according to kinds and features thereof, embeds a robust watermark and fragile watermark with a controlled embedding level or a semi-watermark with a controlled embedding level into securities, etc. in the form of digital file so as to authenticate the original of securities, etc. before issuance and purchase, and adds further an option for printing out only the designated number of sheet.

The present invention provides a new method that has lately attracted attention and is differentiated from the existing various technologies related to the prevention of forgery and alternation. In particular, the method of applying a robust watermark and fragile watermark simultaneously or a semi-watermark only used in the present invention is considerably advanced to the existing various technologies, in the methods facing a variety in the technology of forgery and alternation.

Next, when it comes to using watermark-embedded securities, etc. which are issued through an issuing apparatus, an authenticating apparatus and method thereof are explained.

Figure 9:
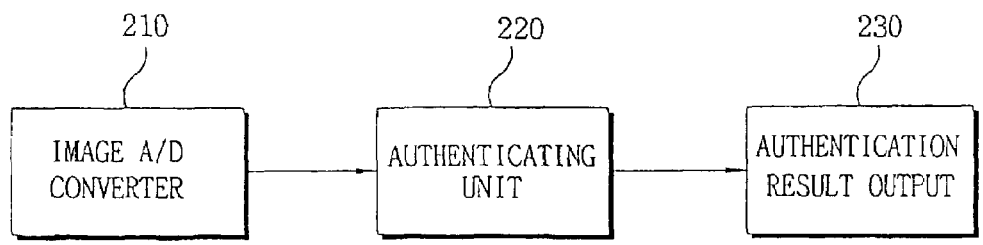
FIG. 9 is a block diagram illustrating an authenticating apparatus of the securities, etc. using digital watermarking according to the embodiment of the present invention.

FIG. 9 is a block diagram illustrating an authenticating apparatus of securities, etc. using digital watermarking according to the embodiments of the present invention.

Referring to FIG. 9, the authenticating apparatus comprises an image A/D converter 210 for reading watermark-embedded securities, etc. in the form of paper and converting them into the image in the form of digital, an authenticating unit 220 fof detecting watermark in the digitalized image in said image A/D converter 210 and determining the authenticity of the securities, etc., and an authentication result output 230 fof printing out the authentication result in said authenticating unit 220.

The authenticating unit 220 analyzes a correlation between the watermark extracted from the digitalized image in the image A/D converter 210 and the watermark generated from character information of the digitalized image and determines the authenticity of the securities, etc.

In analyzing the correlation in the authenticating unit (220), in case where said extracted and generated watermark are a robust watermark and fragile watermark, a successful extraction of both watermarks results in legality of securities, etc., and extraction of either robust watermark or fragile watermark results in illegality of securities, etc.

Further, In connection with analysis of the correlation in said authenticating unit 220, in case where the extracted and generated watermark is a semi-watermark, a successful extraction of said semi-watermark results in the legality of securities, etc. and no extraction results in the illegality of securities, etc.

Figure 10:
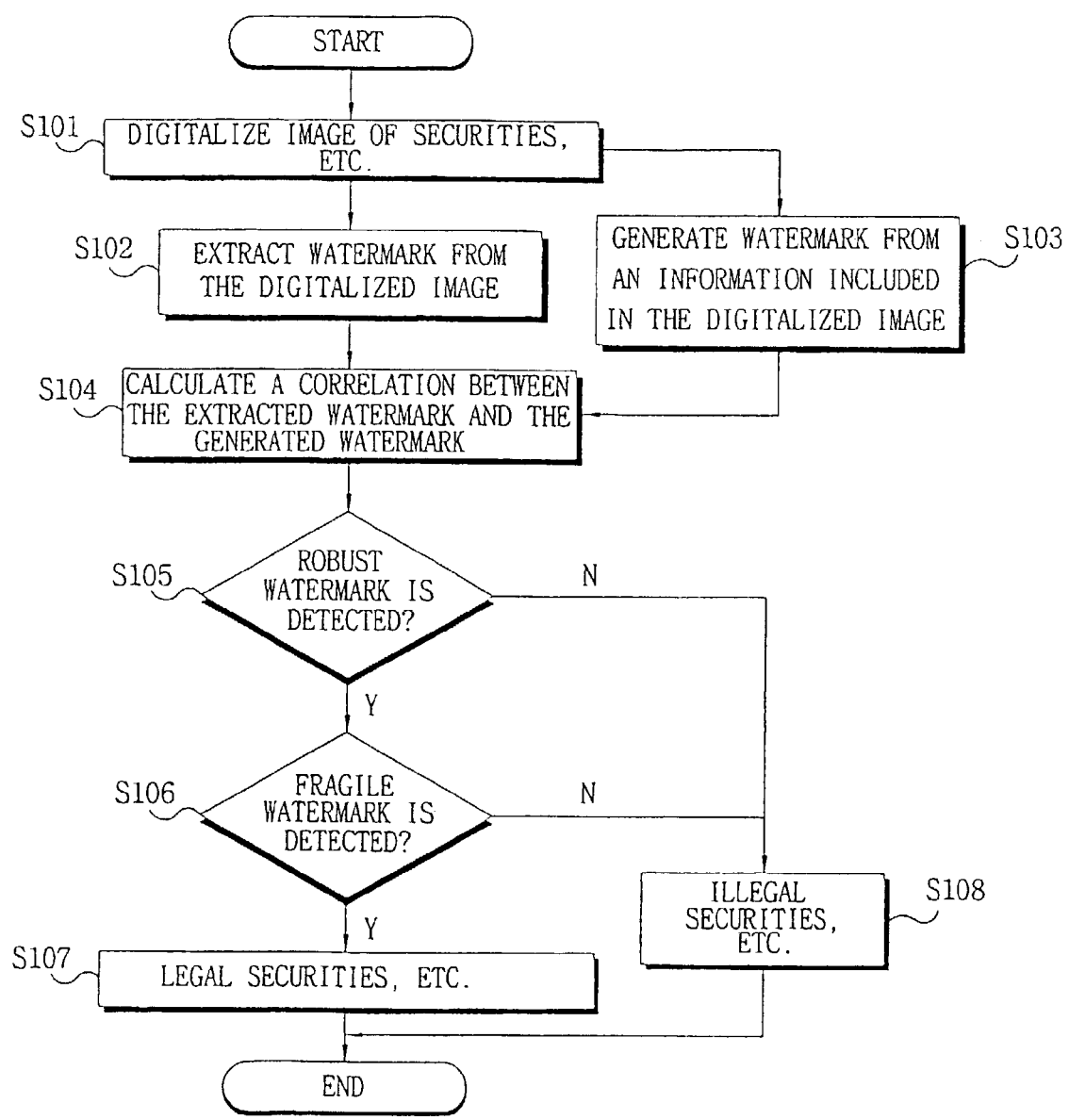
FIG. 10 is a flow chart illustrating a process of authenticating the securities, etc. from the authenticating apparatus of FIG. 9.

FIG. 10 is a flowchart illustrating a process of authenticating the securities, etc. from the authenticating apparatus of FIG. 9.

First, a watermark-embedded securities, etc. to be authenticated in the form of paper is image-digitalized through a scanner (S101). In this step, the existing scanner can be employed or it can be converted into the digitalized image through a digital camera, etc.

If the digitalized image of securities, etc. is obtained, watermark which is embedded at said issuing apparatus is extracted from said digitalized image. Said extraction is made, using a character recognizing apparatus, by extracting information on the par value, information on the term of validity, information on the issuing person or issuer concerned, etc., which are embedded as a watermark at the issuing apparatus (S102).

Further, a watermark is generated from the character information of said digitalized image of securities, etc. (S103). In this regard, the generated watermark a little varies depending on the watermarking method employed in generating a watermark at the issuing apparatus of the present invention.

In case where the watermarking method employed in generating a watermark at the issuing apparatus is a key-type method, since a signal (watermark) to be embedded into securities, etc. is generated by making the information included in the digitalized image as a key, a watermark is generated from the digitalized image by making the information of character which is included in securities, etc. as a key using a (optical) character recognizing apparatus.

In extracting and generating watermark in the authenticating process for preventing securities, etc. from being forged and altered, only the image part from which watermark is extracted is extracted. For example, in the case of an electronic stamp, there is a process of extracting only a stamp part from the scanned entire image except the existing envelope part.

Such process is to extract a specific part from the obtained image like the recognizing apparatus of number plate of vehicle. In this regard, Korean Patent Application No. 1999-41111 with the same applicant as that of the present invention discloses the above technology in detail.

The correlation analysis between such extracted and generated watermarks is calculated in order to determine the authenticity of the securities, etc (S104).

As a result of analyzing a correlation between said extracted and generated robust watermarks (S105), failure to extract a robust watermark causes to illegality of securities, etc., thereby losing their effectiveness (S108).

In said step of S105, if a robust watermark is extracted, by means of the correlation analysis between said extracted and generated fragile watermarks (S106), a successful extraction of a fragile watermark causes to legality of securities, etc. and thus enables their effective distribution (S107), failure of such extraction causes to illegality of securities, etc. and enables to lose their effectiveness (S108). In other words, failure to extract a fragile watermark is considered confirming that securities, etc. are not original but photocopy.

Further, in case where said extracted and generated watermark is a semi-watermark, by means of the correlation analysis, a successful extraction of a semi-watermark causes to legality of securities, etc. and enables their effective circulation, failure in extraction of a semi-watermark causes to illegality of securities, etc. and enables to lose their effectiveness.

In case of generating and embedding a watermark in combination with a logo-type method and key-type method mentioned above, in connection with said determining the authenticity of the securities, etc., in case where extracted and generated watermark is a logo-type method watermark and key-type method watermark, whether securities, etc. are forged or altered is decided in comparison with information of securities, etc. extracted by a logo-type method and logo information initially embedded, and whether securities, etc. are forged or altered and photocopied is decided in comparison with information of securities, etc. extracted by a key-type method and information initially embedded as a key.

With respect to said determining the authenticity of the securities, etc., whether securities, etc. are forged or altered is decided in comparison with information of securities, etc. extracted by a key-type method and information initially embedded as a key and whether securities, etc. are forged or altered and photocopied is decided in comparison with information of securities, etc. extracted by a logo-type method and logo information initially embedded.

Figure 11A:
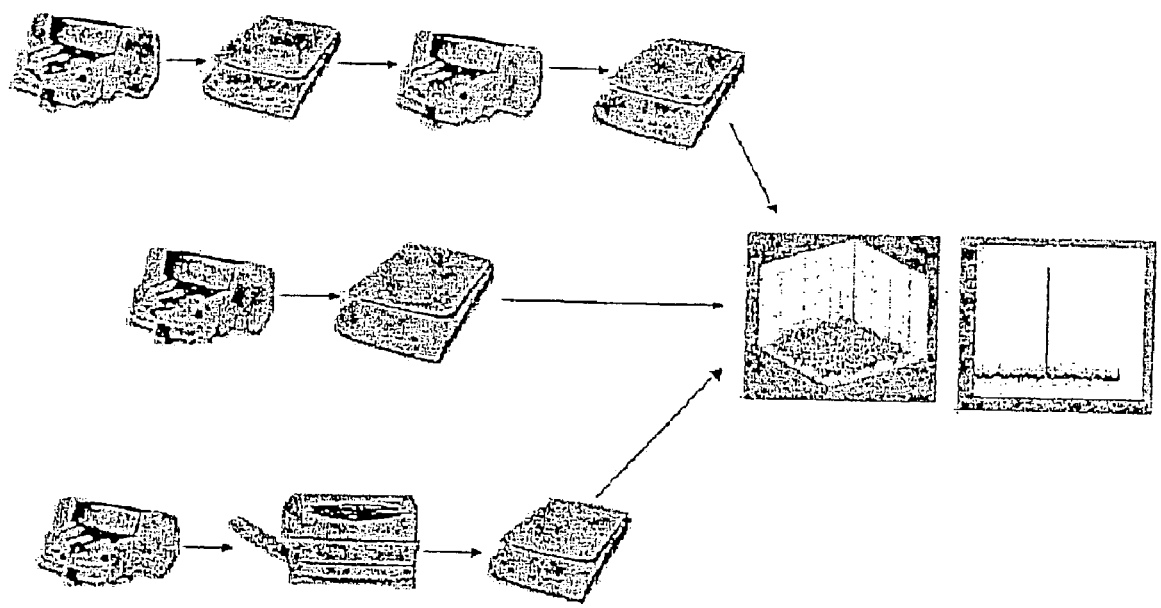
FIG. 11a is a drawing showing the experiment result of the correlation analysis between the robust watermark extracted from the digitalized image which has undergone various external modification process and the robust watermark generated from the character information of the digitalized image in the authenticating apparatus of FIG. 9.

FIG. 11a is a drawing showing the experiment result of the correlation analysis between the robust watermark extracted from the digitalized image which has undergone various external modification process and the robust watermark generated from the character information of the digitalized image in the authenticating apparatus of FIG. 9.

Robust watermark embedded securities, etc, in the form of paper shows the extraction result of robust watermark according to the processing each executed as described below.
1) Print out→scan: extraction of robust watermark
2) Print out→photocopy→scan: extraction of robust watermark
3) Print out→scan→print out→scan: extraction of robust watermark As such, a robust watermark survived an illegal photocopy or illegal scan besides the first print out and the scan for authentication. That is, said authentication through a robust watermark does not decide the forgery such as illegal photocopy but executes the function of deciding the alteration such as change in the face value. Absolutely, if such alteration occurred, there is no extracted robust watermark.

Figure 11B:
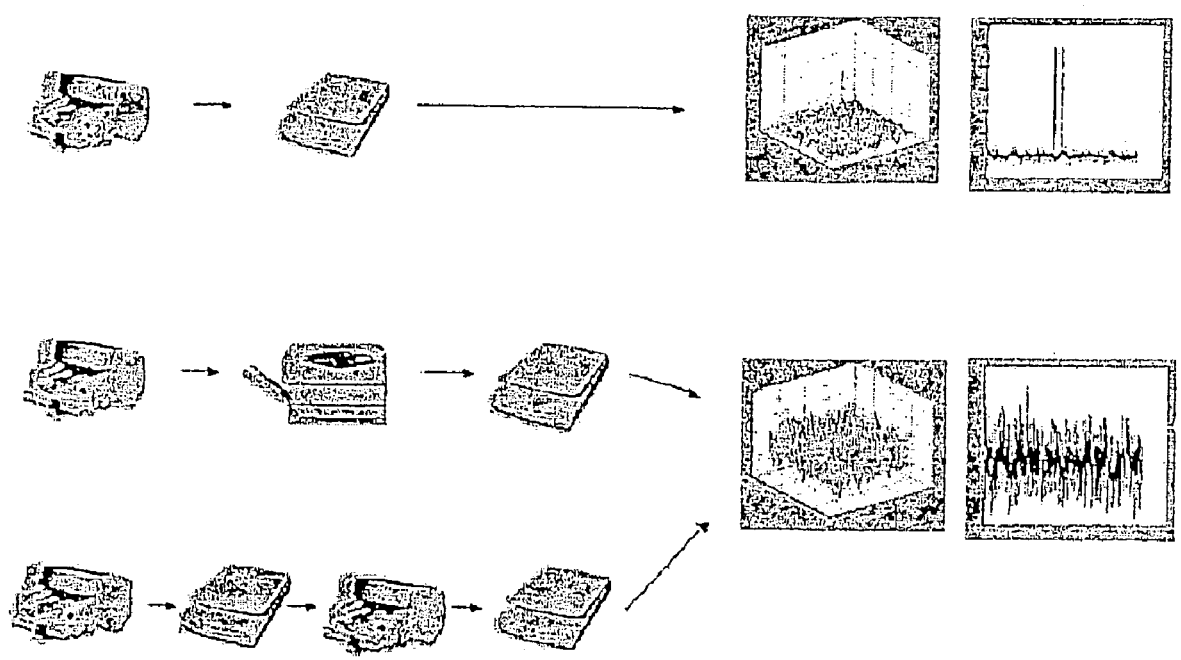
FIG. 11b is a drawing showing the experiment result of the correlation analysis between the fragile watermark extracted from the digitalized image which has undergone various external modification process and the fragile watermark generated from the character information of the digitalized image in the authenticating apparatus of FIG. 9.

FIG. 11b is a drawing showing the experiment result of the correlation analysis between the fragile watermark extracted from the digitalized image which has undergone various external modification process and the fragile watermark generated from the character information of the digitalized image in the authenticating apparatus of FIG. 9.

Fragile watermark embedded securities, etc, in the form of paper shows the extraction result of a fragile watermark according to the processing each executed as described below.
1) Print out→scan: extraction of fragile watermark
2) Print out→photocopy→scan: no extraction of fragile watermark
3) Print out→scan→print out→scan: no extraction of fragile watermark Like said result of 1), both extraction of robust watermark and fragile watermark authenticates that the paper-formed print out is the original and legal securities, etc. Like said results of 2) and 3), although extraction of a robust watermark makes it possible to expect that the paper-formed print out is the original without alternation, no extraction of a fragile watermark indicates that the paper-formed print out is illegal securities, etc. which are photocopies forged with an undesirable intention.

Figure 11C:
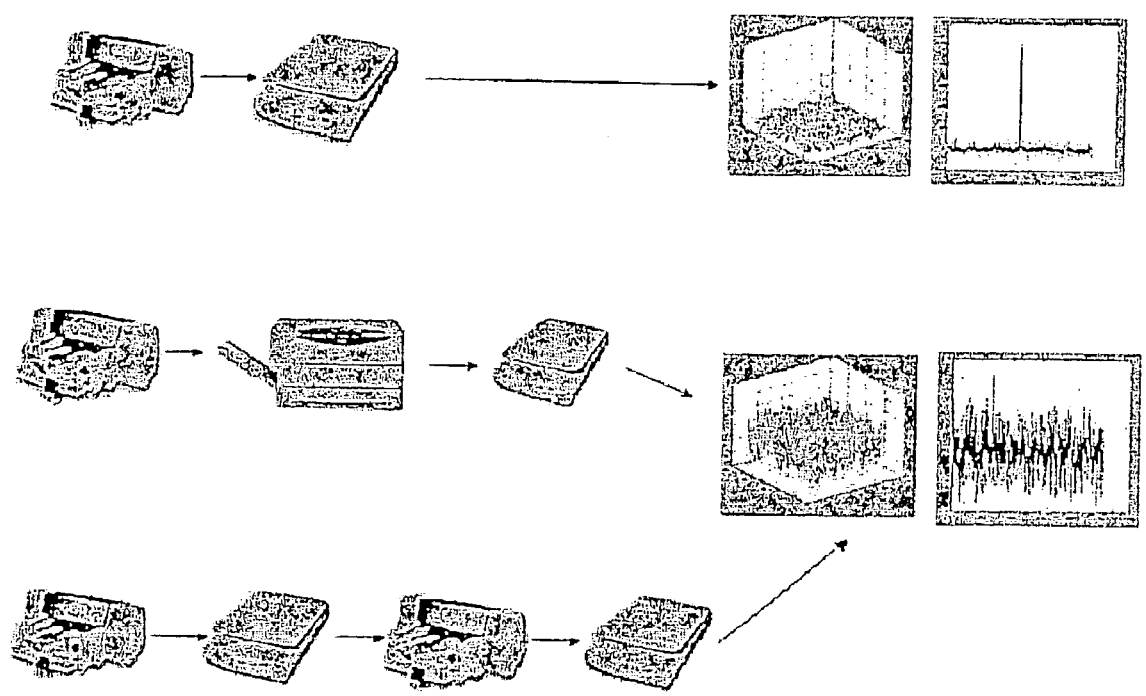
FIG. 11c is a drawing showing the experiment result of the correlation analysis between the semi-watermark extracted from the digitalized image which has undergone various external modification process and the semi-watermark generated from the character information of the digitalized image in the authenticating apparatus of FIG. 9.

FIG. 11c is a drawing showing the experiment result of the correlation analysis between the semi-watermark extracted from the digitalized image which has undergone various external modification process and the semi-watermark generated from the character information of the digitalized image in the authenticating apparatus of FIG. 9.

Semi-watermark embedded securities, etc, in the form of paper shows the extraction result of a semi-watermark according to the processing each executed as described below.
1) Print out→scan: extraction of semi-watermark (robust watermark characteristic)
2) Print out→photocopy→scan: no extraction of semi-watermark (fragile watermark characteristic)
3) Print out→scan→print out→scan: no extraction of semi-watermark (fragile watermark characteristic)

Like said result of 1), extraction of a semi-watermark authenticates that the paper-formed print outs are the original and legal securities, etc. and like said result of 2) and 3), no extraction of a semi-watermark indicates that they are illegal securities, etc. being photocopied with an undesirable intention.

Industrial Applicability

As described above, apparatus and method for issuing and authenticating securities, etc. using digital watermarking of the present invention makes it possible to issue and purchase securities, etc. on-line with the existing design of securities, etc.

In other words, while a user does not going to an issuer in person and issuing or purchasing paper-formed securities, etc., the user can issue or purchase securities, etc. on-line without a limitation of time or place and use the paper-formed securities, etc. off-line in printed-out form. Further, when using the issued or purchased securities, etc., it can easily and accurately determine the forgery or alternation thereof employing a simple apparatus.

Thus, it constitutes a safe and transparent system of circulation of securities, etc. and thus activating the circulation.

Up to now, although the preferred embodiments of apparatus and method for issuing and authenticating securities, etc. using digital watermarking of the present invention are disclosed and explained, such embodiments are merely for illustrations but are not restricted to the illustrations for those skilled in the art.

That is, with another authentication server, a watermark is embedded and extracted according to the used period and serial number of securities, etc. authenticated in said server, which makes it possible to prevent illegally photocopied securities, etc. from being double-used, or forged or altered as to the used period. It is obvious that such can be variously changed, transformed and replaced within the scope of the technical idea of the present invention.

Further, it should be understood that the technical idea of the present invention is not restricted to the aforementioned embodiments but to only the claims attached hereto and their equivalent technical principle.

What is claimed is

1. A method of issuing conventional securities comprising at least one of gift coupons, tickets, coupons, electric stamps, bonds and debentures, notes, stock certificates, lotteries, paper money, checks, which are in a digitalized file form, and public documents being issued requiring confirmation and authentication in printed-out form to a user, the method comprising the steps of:
(a) connecting said user to a site which provides a service for issuing said conventional securities through a network and selecting an issuance-option, for controlling printing;
(b) generating a digital file of said conventional securities and a watermark according to said issuance-option;
(c) embedding said generated watermark into said digital file of said conventional securities; wherein said embedding said watermark comprises at least one of embedding a robust watermark and a fragile watermark simultaneously, and embedding a semi-watermark into said digital file; and wherein said fragile watermark and said semi-watermark are embedded with a controlled embedding level such that said fragile watermark and said semi-watermark on said printed-out conventional securities survive and are detectable only when said printed-out conventional securities have experienced the first A/D conversion through a scanner, do not survive and are undetectable when said securities have experienced later A/D or D/A conversion,
(d) printing said watermark-embedded digital file.

2. The method according to claim 1, wherein said watermark is generated in step (a) by using at least one of a key-type method, a logo-type method and a method simultaneously employing both methods.

3. The method according to claim 2, wherein said generating watermark using a key-type method comprises, at least one of generating said watermark by a plurality of keys in accordance with primary information of said conventional securities and generating said watermark using a checksum or hash-value obtained from the entire information of said conventional securities.

4. The method according to claim 1, wherein said step (d) comprises the steps of:
   (d1) adding an option for controlling printing of said watermark-embedded digital file; and
   (d2) printing said watermark-embedded digital file according to said option for controlling printing.

5. The method according to claim 4, wherein said option for controlling printing at said step (d1) comprises an option for setting the number of print outs of said watermark-embedded digital file.

6. The method according to claim 5, wherein said option for controlling printing further comprises, in the state of setting said number of print outs, an option for commanding a memory to delete the latest document simultaneously with an end of printing command after the printing command has been executed.

7. The method according to claim 4, wherein said option for controlling printing at said step (d1) comprises, an option for displaying only information of said conventional securities to be issued or only an image of conventional securities without watermark embedded thereto on a screen of the user's terminal when said watermark-embedded digital file is printed.

8. An apparatus for issuing conventional securities comprising at least one of gift coupons, tickets, coupons, electric stamps, bonds & debentures, notes, stock certificates, lotteries, paper money, checks, which are in a digitalized file form, and public documents being issued requiring confirmation and authentication in printed form to a user, the apparatus comprising:
   an issuing means for issuing conventional securities in the form of a digital file;
   a terminal connected to said issuing means through a network, transmitting an issuance-option, which is an option for controlling the printing, by selection of said user of conventional securities to said issuing means, and receiving conventional securities according to said issuance-option from said issuing means; and
   print-out means connected to said terminal for printing said conventional securities received from said terminal,
   wherein said issuing means comprises:
   means for generating a digital file of said conventional securities and watermark according to said issuance-option, and
   means for embedding said generated watermark into said digital file of said conventional securities;
   wherein said embedding watermark comprises, at least one of embedding a robust watermark and a fragile watermark simultaneously, and embedding a semi-watermark into said digital file; and
   wherein said fragile watermark and said semi-watermark are embedded with a controlled embedding level such that said fragile watermark and said semi-watermark on said printed-out conventional securities survives and are detectable only when said printed-out conventional securities have experienced the first A/D conversion through a scanner, does not survive and are undetectable when said securities have experienced later A/D or D/A conversion.

9. The apparatus according to claim 8, wherein said means for generating watermark generates said watermark by using at least one of a key-type method, a logo-type method, and a method simultaneously employing both methods.

10. The apparatus according to claim 9, wherein said generating watermark using a key-type method comprises, at least one of generating said watermark by a plurality of keys in accordance with primary information of said conventional securities and generating said watermark using a checksum or hash-value obtained from the entire information of said conventional securities.

11. The apparatus according to claim 8, wherein said issuing means further comprises an option for controlling printing of said watermark-embedded digital file.

12. The apparatus according to claim 11, wherein said option for controlling printing comprises an option for setting the number of print outs of said watermark-embedded digital file.

13. The apparatus according to claim 12, wherein said option for controlling printing further comprises, in the state of setting said number of print outs, an option for commanding a memory to delete the latest document simultaneously with an end of printing command after the printing command has been executed.

14. The apparatus according to claim 11, wherein said option for controlling printing comprises, an option for displaying only information of said conventional securities to be issued or only an image of conventional securities without watermark embedded thereto on a screen of the user's terminal when said watermark-embedded digital file is printed.

15. A method for authenticating watermark-embedded conventional securities in printed form, the method comprising the steps of:
   (a) reading said watermark-embedded conventional securities in printed form and converting said conventional securities to a digitalized image;
   (b) extracting a watermark embedded at an issuing apparatus from said digitalized image;
   (c) generating a watermark from information included in said digitalized image; and
   (d) determining authenticity of said conventional securities by calculating a correlation between said extracted watermark and said generated watermark, and wherein said watermark-embedded conventional securities in printed form are issued on-line through a network by an issuance-option for controlling printing,
   wherein said step (d) comprises the steps of:
   (d1) calculating a correlation between the extracted robust watermark and the generated robust watermark; and
   (d2) calculating a correlation between extracted fragile watermark and generated fragile watermark,
   wherein the determination of the authenticity of said conventional securities is made based at least in part on whether the correlation calculation between said robust watermarks and between said fragile watermarks satisfies a predetermined correlation condition, and wherein the watermark on said conventional securities in printed form survives and is detectable only when said conventional securities in printed form have experienced said converting to a digitalized image and not detected does not survive and is undetectable when said securities have experienced later A/D or D/A conversion.

16. A method for authenticating watermark- embedded conventional securities in printed form, the method comprising the steps of:

(a) reading said watermark-embedded conventional securities in printed form and converting said conventional securities to a digitalized image;
(b) extracting a watermark embedded at an issuing apparatus from said digitalized image;
(c) generating a watermark from information included in said digitalized image; and
(d) determining authenticity of said conventional securities by calculating a correlation between said extracted watermark and said generated watermark, and wherein said watermark-embedded conventional securities in printed form are issued on-line through a network by an issuance-option for controlling the printing;
wherein said step (d) comprises a step of:
calculating a correlation between the extracted semi-watermark and the generated semi-watermark, wherein the determination of the authenticity of said conventional securities is made based at least in part on whether the correlation calculation between said semi-watermarks satisfies a predetermined correlation condition, and wherein the watermark on said conventional securities in printed form survives and is detectable only when said conventional securities in printed form have experienced said converting to a digitalized image does not survive and is undetectable when said securities have experienced later A/D or D/A conversion.

17. An apparatus for authenticating watermark-embedded conventional securities in printed form, the apparatus comprising:
an image A/D converter for reading said watermark-embedded conventional securities in printed form and converting said conventional securities to a digitalized image; and
an authenticating unit for extracting a watermark embedded at an issuing apparatus from said digitalized image, generating a watermark from information included in said digitalized image, and determining authenticity of said conventional securities by calculating a correlation between said extracted watermark and said generated watermark, and a network having an issuance-option for controlling the printing to allow a user to issue said watermark-embedded conventional securities in printed form on-line; wherein said authenticating unit comprises:
means for calculating a correlation between the extracted robust watermark and the generated robust watermark; and
means for calculating a correlation between the extracted fragile watermark and the generated fragile watermark,
wherein the determination of the authenticity of said conventional securities is made based at least in part on whether the correlation calculation between said robust watermarks and between said fragile watermarks satisfies a predetermined correlation condition, and wherein the watermark on said conventional securities in printed form survives and is detectable only when said conventional securities in printed form have experienced said converting to a digitalized image by the image A/D converter and does not survive and is undetectable when said securities have experienced later A/D or D/A conversion.

18. An apparatus for authenticating watermark-embedded conventional securities in printed form, the apparatus comprising:
an image A/D converter for reading said watermark-embedded conventional securities in printed form and converting said conventional securities to a digitalized image; and
an authenticating unit for extracting a watermark embedded at an issuing apparatus from said digitalized image, generating a watermark from information included in said digitalized image, and determining authenticity of said conventional securities by calculating a correlation between said extracted watermark and said generated watermark, and a network having an issuance-option for controlling the printing to allow a user to issue said watermark-embedded conventional securities in printed form on-line; wherein said authenticating unit comprises:
means for calculating a correlation between the extracted semi-watermark and the generated semi-watermark,
wherein the determination of the authenticity of said conventional securities is made based at least in part on whether the correlation calculation between said semi-watermarks and satisfies a predetermined correlation condition, and wherein the watermark on said conventional securities in printed form survives and is detectable only when said conventional securities in printed form have experienced said converting to a digitalized image by the image A/D converter and does not survive and is undetectable when said securities have experienced later A/D or D/A conversion.

* * * * *